United States Patent
Park et al.

(10) Patent No.: US 6,661,183 B2
(45) Date of Patent: Dec. 9, 2003

(54) APPARATUS AND METHOD FOR INTERCEPTING LEAKAGE OF MICROWAVE

(75) Inventors: Chang-Sin Park, Gyeongsangbuk-Do (KR); Hyoun-Soo Hea, Gyeongsangbuk-Do (KR)

(73) Assignee: LG Electronics Inc. (KR)

( * ) Notice: Subject to any disclaimer, the term of this patent is extended or adjusted under 35 U.S.C. 154(b) by 49 days.

(21) Appl. No.: 10/121,787

(22) Filed: Apr. 11, 2002

(65) Prior Publication Data

US 2003/0062852 A1 Apr. 3, 2003

(30) Foreign Application Priority Data

Sep. 28, 2001 (KR) .......................................... 2001-60711
Nov. 23, 2001 (KR) .......................................... 2001-73475

(51) Int. Cl.[7] .............................................. H05B 41/16
(52) U.S. Cl. .......................................... 315/248; 315/39
(58) Field of Search ........................ 315/248, 39, 267, 315/344

(56) References Cited

U.S. PATENT DOCUMENTS 5,847,517 A * 12/1998 Ury et al. .................... 315/248
5,977,712 A * 11/1999 Simpson ........................ 315/39
6,046,545 A * 4/2000 Horiuchi et al. ............... 315/39
6,577,074 B1 * 6/2003 Ervin et al. .................. 315/248
2002/0030453 A1 * 3/2002 Kirkpatrick et al. ........ 315/248

* cited by examiner

*Primary Examiner*—Don Wong
*Assistant Examiner*—Thuy Vinh Tran
(74) *Attorney, Agent, or Firm*—Ostrolenk, Faber, Gerb & Soffen, LLP

(57) ABSTRACT

An apparatus and method for intercepting leakage of microwave includes an electrodeless bulb for generating light by microwave generated from a magnetron, a sensing unit installed outside the resonator for intercepting the microwave, for passing light generated in the electrodeless bulb and outputting a corresponding sensing signal by sensing at real time whether the microwave is leaked and a control unit for turning on or off a power supplied to the magnetron by the sensing signal, thus to prevent a fire by leakage of the microwave and secure safety of a user by intercepting the microwave leaked by damage of the resonator of the lighting apparatus using the microwave.

34 Claims, 4 Drawing Sheets

APPARATUS AND METHOD FOR INTERCEPTING LEAKAGE OF MICROWAVE

BACKGROUND OF THE INVENTION

1. Field of the Invention

The present invention relates to a lighting apparatus using microwave and particularly, to an apparatus and method for intercepting leakage of microwave which intercepts microwave leaked by a damage in a resonator in the lighting apparatus.

2. Description of the Background Art

Generally, the apparatus using a microwave is an apparatus for generating visible rays or ultraviolet rays by applying microwave to an electrodeless bulb. The electrodeless bulb in the lighting apparatus has longer life span than that of incandescent lamp or fluorescent lamp which is generally used and has higher lighting effect.

FIG. 1 is a view showing a composition of a conventional lighting apparatus using microwave.

As shown in FIG. 1, the conventional lighting apparatus using microwave includes a magnetron 17 positioned in a case 16 of the lighting apparatus, for generating microwave, a high voltage generator 18 for supplying an alternate current power source into the magnetron 17 after raising the voltage into a high voltage, a waveguide 15 for inducing microwave from the magnetron 17, an electrodeless bulb 14 for generating light by absorbing -energy of the microwave induced by the waveguide 15, a resonator 12 covered on the front side of the electrodeless bulb 14, for intercepting the microwave and passing the light generated from the electrodeless bulb 14, a reflector 11 for reflecting the light from the resonator 12 to be directly moved, a mirror 13 positioned at the lower portion of the resonator 12, for passing the microwave and reflecting the light and a cooling fan 21 installed at the lowermost portion of the case 16, for cooling the magnetron 17 and high voltage generator 18. Here, the electrodeless bulb 14 is made of quartz or ceramic and includes an emitting unit 14A in which luminescent material is sealed to emit light by the microwave and a bulb stem 14B combined with the emitting unit 14A and lengthened to the inner side of the waveguide 15. Also, the resonator 12 is formed as a cylindrical shape with an end opened in a mesh structure, to be connected with the waveguide 15 by having the opened part being covered on the electrodeless bulb 14. Also, in the conventional lighting apparatus using microwave, a bulb motor 19 for rotating the electrodeless bulb 14 and a fan motor 20 for driving the cooling fan 21 are further installed.

Hereinafter, the operation of the conventional lighting apparatus using microwave will be described as follows.

First, a control unit (not shown) outputs a driving signal into the high voltage generator 18. At this time, the high voltage generator 18 raises the voltage of the alternate current and supplies the raised voltage into the magnetron 17.

The magnetron 17 generates microwave by blistering by the high voltage supplied from the high voltage generator 18 and emits the generated microwave into the waveguide 15. Here, the microwave is emitted to the inside of the resonator 12, generates light having a specific discharge spectrum by emitting the luminescent material sealed in the electrodeless bulb 14 and the light is reflected to the front side by the reflector 11 and the mirror 13 lighting the space.

Then, the control unit cools heat of the high voltage generator 18, magnetron 17 and the electrodeless bulb 14 by driving the bulb motor 19 and fan motor 20 when the high voltage generator is driven, to prevent the magnetron from being overheated by generating heat by itself.

However, the conventional lighting apparatus using microwave has some problems that it damages the circumstance leaking the microwave through the damaged when the resonator 12 is damaged by an unexpected reason or high heat generated in the electrodeless bulb 14.

Also, the conventional lighting apparatus using microwave has a problem that safety of a user is hindered since the microwave is leaked to outside if the resonator 12 is operated under the condition that it is damaged.

SUMMARY OF THE INVENTION

Therefore, the present invention provides an apparatus and method for intercepting leakage of microwave, capable of preventing a fire by leakage of microwave and securing safety of a user by intercepting microwave leaked from a resonator of a lighting apparatus using the microwave.

To achieve these and other advantages and in accordance with the purpose of the present invention, as embodied and broadly described herein, there is provided an apparatus for intercepting leakage of microwave, including an electrodeless bulb for generating light by microwave generated from a magnetron, a sensing unit installed outside the resonator for intercepting the microwave, for passing light generated in the electrodeless bulb and outputting a corresponding sensing signal by sensing at real time whether the microwave is leaked and a control unit for turning on or off a power supplied to the magnetron by the sensing signal.

To achieve these and other advantages and in accordance with the purpose of the present invention, as embodied and broadly described herein, there is provided a method for intercepting leakage of microwave, including the steps of generating a corresponding current detection signal by detecting current applied to a magnetron, generating a corresponding optical detection signal by detecting the light from the electrodeless bulb for generating light by microwave outputted from the magnetron and intercepting a power supplied to the magnetron by sensing whether the microwave is leaked on the basis of the current detection signal and optical detection signal.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the apparatus and method for intercepting leakage of microwave, capable of preventing a fire by leakage of microwave because of damage in a resonator and securing safety of a user by intercepting microwave leaked from the resonator of a lighting apparatus using the microwave, examples of which are illustrated with reference to FIGS. 2 to 4.

Figure 1:
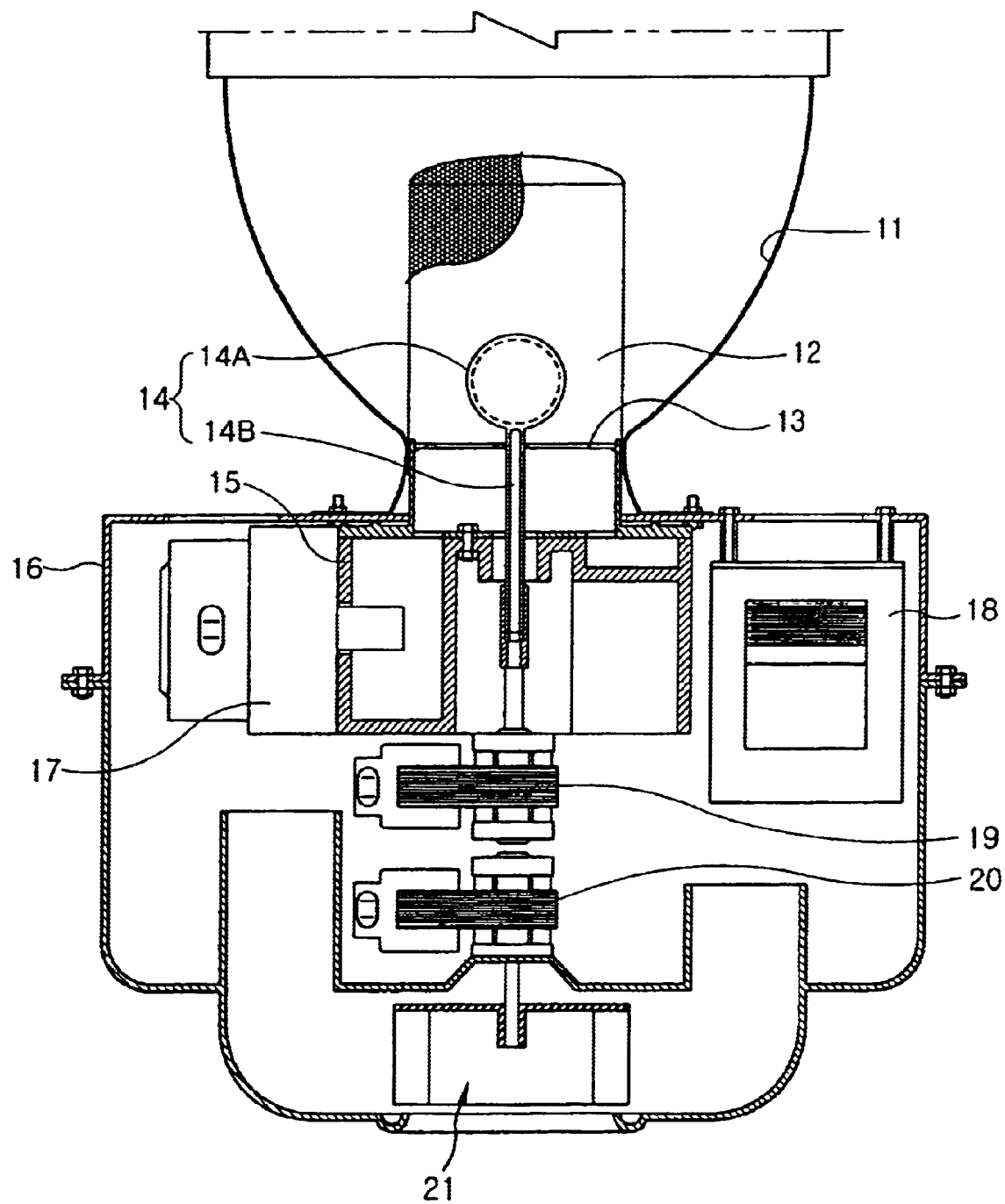
FIG. 1 is a view showing a composition of a conventional lighting apparatus using microwave.
Figure 2:
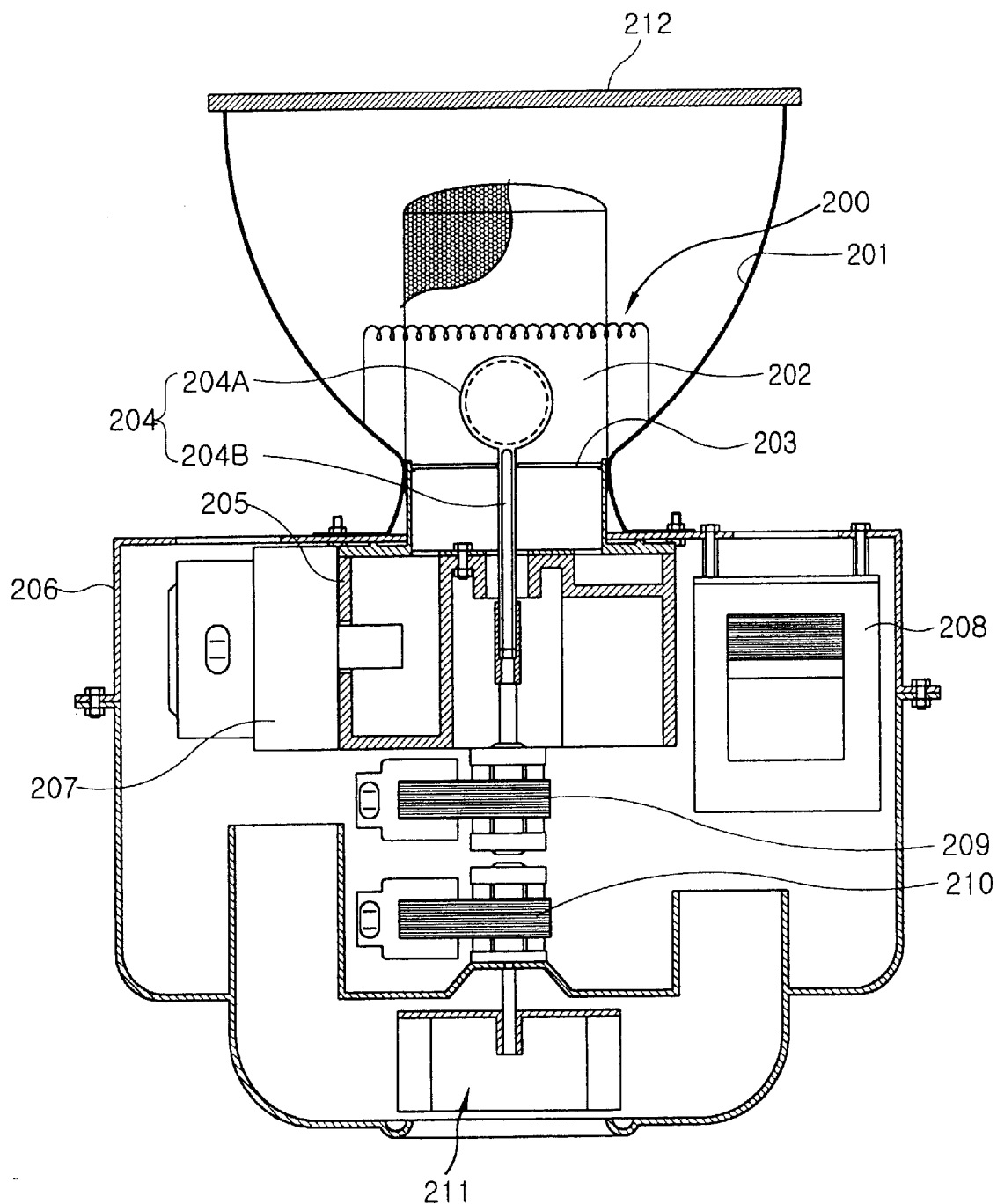
FIG. 2 is a view showing a composition of a lighting apparatus using microwave in accordance with a first embodiment of the present invention.

FIG. 2 is a view showing a composition of a lighting apparatus using microwave in accordance with a first embodiment of the present invention.

As shown in FIG. 2, the lighting apparatus using microwave in accordance with the first embodiment of the present invention includes a high voltage generator 208 for supplying an alternate current power source after raising the voltage into a high voltage, a magnetron 207 positioned in a case 206 of the lighting apparatus, for generating microwave, a waveguide 205 for inducing the microwave, an electrodeless bulb 204 for generating light by absorbing energy of the microwave induced by the waveguide 205, a resonator 202 covered on the front side of the electrodeless bulb 204, for intercepting the microwave and passing the light generated from the electrodeless bulb 204, a reflector 201 for reflecting the light from the resonator 202 to be directly moved, electron wave intercepting glass 212 installed at the upper portion of the resonator 205 supported by the reflector 201, for intercepting the microwave, a mirror 203 positioned at the lower portion of the resonator 202, for passing the microwave and reflecting the light, a cooling fan 211 installed at the lowermost portion of the case 206, for cooling the magnetron 207 and high voltage generator 208, a sensing unit 200 installed outside the resonator 202 for intercepting the microwave, for passing light generated in the electrodeless bulb and outputting a corresponding sensing signal by sensing at real time whether the microwave is leaked and a control unit (not shown) for turning on or off a power supplied to the magnetron 207 by the sensing signal.

Here, the electrodeless bulb 14 is made of quartz or ceramic and includes an emitting unit 204A in which luminescent material is sealed to emit light by the microwave and a bulb stem 204B combined with the emitting unit 204A and lengthened to the inner side of the waveguide 205. Also, the resonator 202 is formed as a cylindrical shape with an end opened in a mesh structure, to be connected with the waveguide 205 by having the opened part being covered on the electrodeless bulb 204. Also, in the lighting apparatus using microwave in accordance with the present invention, a bulb motor 209 for rotating the electrodeless bulb 204 and fan motor 210 for driving the cooing fan 211 are further installed.

In the lighting apparatus using microwave in accordance with the first embodiment of the present invention, the apparatus for intercepting leakage of the microwave includes the sensing unit 200, control unit(not shown) and the electron wave intercepting glass 212.

Hereinafter, the operation of the apparatus for intercepting leakage of the microwave in accordance with the first embodiment will be described in detail as follows.

First, the magnetron 207 generates microwave by blistering by the power supplied from the high voltage generator 208. Here, the microwave is emitted to the inside of the resonator 202 through the waveguide 205, generates light having a specific discharge spectrum by emitting the luminescent material sealed in the electrodeless bulb 204 and the light is reflected to the front side by the reflector 201 and the mirror 203 lighting the space.

Then, the electrodeless bulb 204 generates heat with high temperature. At this time, the resonator 202 formed in the mesh structure is damaged by oxidization or corrosion by degradation by the heat with high temperature after predetermined time period and the microwave generated from the magnetron 207 is leaked to the outside through the damaged portion.

Figure 3:
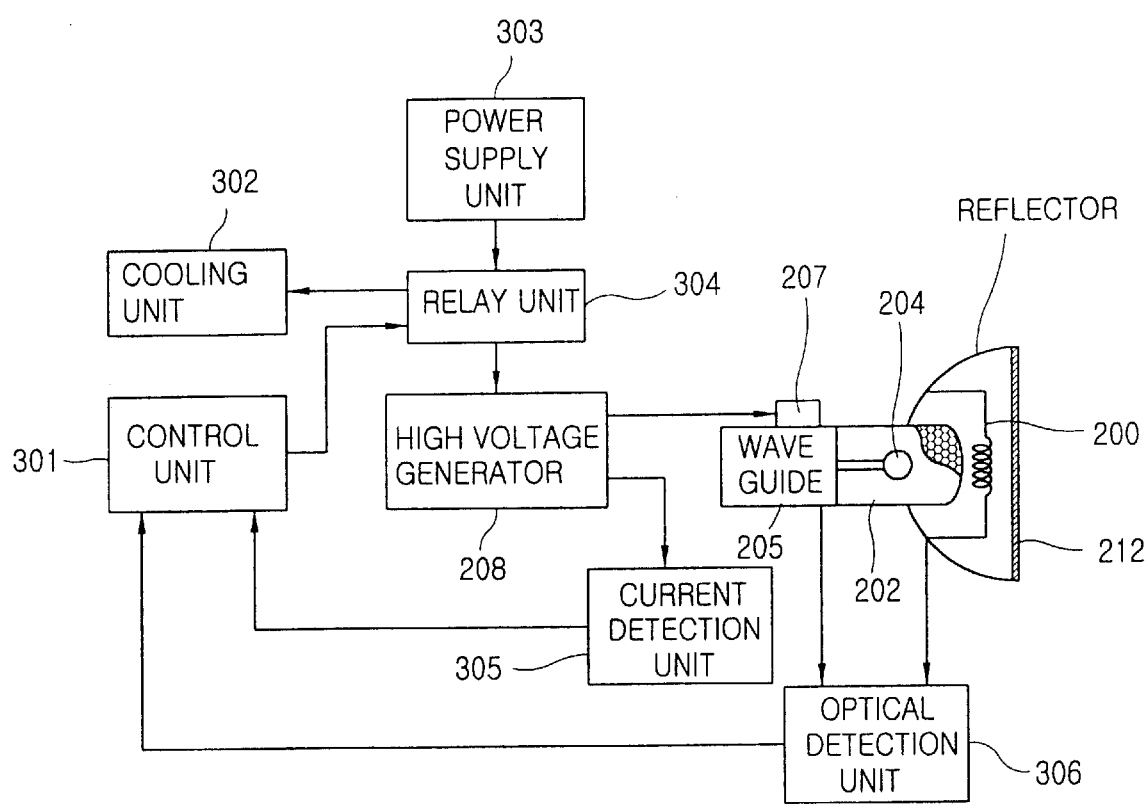
FIG. 3 is a view showing a composition of a lighting apparatus using microwave in accordance with a second embodiment of the present invention.

The sensing unit installed at the outside of the resonator 202 senses the leaked microwave at real time and outputs the corresponding signal into the control unit (not shown) (same as the reference numeral 301 in FIG. 3).

The control unit stops the operation of the magnetron 207 according to the sensing signal so that the microwave is not generated. Therefore, leakage of the microwave can be intercepted On the other hand, the electron wave intercepting glass 212 is installed at the upper portion of the resonator 202 to intercept microwave leaking by breakdown of the sensing unit 200. Also, the electron wave intercepting glass 212 is formed by coating conductive substance with thickness smaller than 0.5 mm on the surface of the glass taking light transmittance rate and electron wave shielding rate into account to intercept electron wave (microwave). Here, it is desirable that the conductive substance is $SnO_2$.

Here, in the sensing unit 200 installed being fixed at the circumference of the resonator 202, various types of sensors capable of sensing high frequency, such as an induction coil for sensing leakage of high frequency (microwave) using difference in current or voltage when the microwave is leaking by damage of the resonator 202, detection diode for sensing leakage of the microwave using change of resistance by risen temperature when the temperature of itself by slight leakage of the high frequency and the like can be applied.

Hereinafter, the operation of the apparatus for intercepting leakage of the microwave in accordance with the second embodiment of the present invention will be described in detail with reference to FIGS. 3 and 4. Here, the sensing unit 200 can accurately and rapidly sense leakage of the microwave and intercept the microwave by further including the apparatus for intercepting leakage of the microwave in accordance with the second embodiment of the present invention.

FIG. 3 is a view showing a composition of a lighting apparatus using microwave in accordance with the second embodiment of the present invention.

As shown in FIG. 3, the lighting apparatus using the microwave includes a power source unit 303 for supplying a power source, a relay unit 304 for passing or intercepting the current applied from the power source unit 303 according to a control signal, a high voltage generator 208 for supplying an alternate current power source after raising the voltage into a high voltage, a magnetron 207 positioned in a case 206 of the lighting apparatus, for generating microwave, a waveguide 205 for inducing the microwave, an electrodeless bulb 204 for generating light by absorbing energy of the microwave induced by the waveguide 205, a resonator 202 covered on the front side of the electrodeless bulb 204, for intercepting the microwave and passing the light generated from the electrodeless bulb 204, an optical detection unit 306 for generating a corresponding optical detection signal by detecting light generated from the electrodeless bulb 204, a current detection unit 305 for generating a corresponding current detection signal by detecting a current applied to the magnetron 207, a control unit 301 for generating and outputting the control signal into the relay unit 304 by determining that the microwave is leaking on the basis of the current detection signal, optical detection signal and the time from the point of time that the relay unit 304 is turned on and the optical detection signal of the optical detection unit 306 and a cooling unit 302 for cooling heat generated in the magnetron 207 and high voltage generator 208. Here, the cooling unit 302 includes the bulb motor 209, fan motor 210 and the cooling fan 211.

The operation of the apparatus for intercepting leakage of the microwave in the lighting apparatus in accordance with the second embodiment of the present invention includes the optical detection unit 306, current detection unit 301 and the relay unit 304. Namely, the sensing unit 200, further including the optical detection unit 306, current detection unit 305 and the relay unit 304, can intercept the microwave by accurately and rapidly sensing leakage of the microwave.

Hereinafter, the operation of the apparatus for interceptin leakage of the microwave in accordance with the second embodiment of the present invention will be described in detail with reference to FIG. 4.

Figure 4:
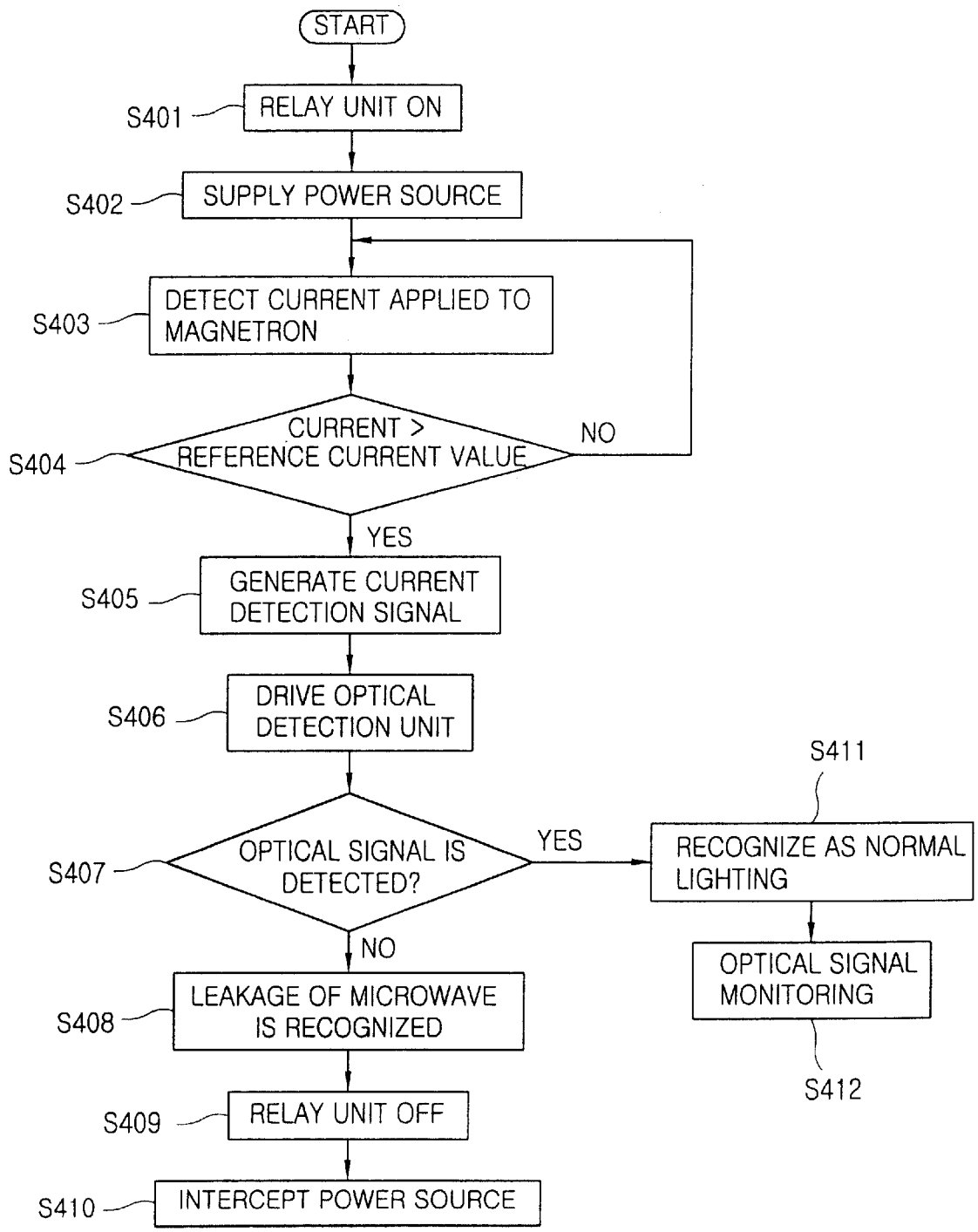
FIG. 4 is a flowing chart showing a method for intercepting leakage of microwave in accordance with the second embodiment of the present invention.

FIG. 4 is a flowing chart showing a method for intercepting leakage of microwave in accordance with the second embodiment of the present invention.

First, the relay unit 304 applies a power supplied from the power source unit 303 to the high voltage generator 208 according to the control signal outputted from the control unit 301. The high voltage generator 208 raises the voltage of the power applied through the relay unit 304 and supplies the power to the magnetron 207. Here, the relay unit 304 turns on or off the operation of the magnetron 207 by passing or intercepting the power supplied from the power supply unit 303 according to the control signal outputted from the control unit 301. Namely, the relay unit 304 intercepts the leaking microwave by turning off the operation of the magnetron 207 in case the microwave is leaked to the outside under the condition that the operation of the magnetron is on (S401 to S402).

The magnetron receives the voltage-raised power from the high frequency generator 208 and generates microwave. The generated microwave is focused to the electrodeless bulb in the resonator 202 through the waveguide 205. At this time, the electrodeless bulb 204 generates light by absorbing the energy of the microwave.

Then, the current detection unit 305 detects the current applied to the magnetron 207 and outputs the corresponding current detection signal into the control unit. Namely, the current detection unit 305 detects the current applied to the magnetron 207 from the high voltage generator 208 using the current transformer, converts the detected current into a voltage (current detection signal) and outputs the voltage into the control unit (S403).

On the other hand, the optical detection unit 306 is driven after a predetermined time (3 seconds) from the point of time when the current detection signal is generated from the current detection signal or when the relay unit 304 is turned on, converts the light emitted from the electrodeless bulb 204 to the outside into an optical signal and outputs an optical signal into the control unit 301 by generating the corresponding optical detection signal. Here, the optical detection unit 306, installed at the waveguide 205 or (and) at the circumference of the reflector, converts the light emitted to the outside of the electrodeless bulb 204 into an optical signal and generates the signal into a corresponding optical detection signal.

The control unit 301 determines whether the microwave is leaking on the basis of the current detection signal generated from the current detection unit 305, the optical detection signal generated from the optical detection unit 306 or the predetermined time (3 seconds) passed from the point of time when the relay unit 304 is turned on and the optical detection signal generated from the optical detection unit 306 and outputs the control signal into the relay unit 304. Namely, the control unit 301 determines that the microwave is leaking if the optical detection signal is not inputted from the optical detection unit 306 in the predetermined time (3 seconds) from the point of time when the microwave is generated and outputs the control signal for turning off the operation of the relay unit into the relay unit 304. Here, the it is desirable that the predetermined time is maximum 3 second or shorter time and the control unit 301 determines that the microwave is leaking if the optical detection signal is not inputted in the three seconds.

Then, the relay unit 304 receives the control signal from the control unit 301 and turns off the operation of the magnetron 207 by intercepting the power source supplied from the power source unit 303. The microwave can be intercepted by turning off the operation of the magnetron 207.

Also, the control unit 301 turns on or off the operation of the magnetron 207 by recognizing whether the microwave is leaking according to the optical detection signal when the value of the current applied to the magnetron 207 is detected as higher than a predetermined level (reference current value) (S404). Namely, the current detection unit 305 generates the current detection signal (S405) if the current value is higher than a predetermined level and operates the optical detection unit 306 with the detection signal (S406). At this time, the control unit 301 determines whether the optical detection signal is inputted from the optical detection unit 306 in the predetermined time (S407).

Then, as the result of the above determination (S407), the control unit 301 determines that the microwave is leaking to the outside (S408) if the optical detection signal is not inputted (detected) in the predetermined time and turns off the operation of the magnetron 207 (S410) by turning off the operation of the relay unit 304 (by outputting the control signal to the relay unit 304). At this time, the time to the point of time when the optical detection signal is detected is set as 3 seconds or shorter times. Here, the control unit 301 recognizes that light is not generated from the electrodeless bulb by leakage of the microwave if the optical detection signal is not detected.

On the other hand, the control unit 301 determines that the operation of the lighting apparatus is performed normally if the optical detection signal is detected in the predetermined time (3 seconds). Namely, the control unit 301 recognizes that the bulb is lit normally (S411), detects the optical signal and monitors the detection signal) by increasing the pulse of the optical signal and monitors the detection (S412).

As described above, the apparatus and method for intercepting leakage of microwave can intercept leakage of microwave by sensing the microwave leaked by damage of the resonator at real time.

Also, the apparatus and method for intercepting leakage of microwave can also prevent a fire by leakage of the microwave and secure safety of the user by intercepting the microwave leaked by damage of the resonator of the lighting apparatus using the microwave.

Also, the apparatus and method for intercepting leakage of microwave can also can intercept leakage of microwave by sensing the microwave leaked by damage of the resonator of the lighting apparatus using the microwave at real time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for intercepting leakage of microwave, comprising:
    an electrodeless bulb for generating light by microwave generated from a magnetron;
    a sensing unit installed outside a resonator for intercepting the microwave, for passing light generated in the electrodeless bulb and outputting a sensing signal by sensing at real time whether the microwave is leaked; and
    a control unit for turning on or off a power supplied to the magnetron in according with the sensing signal.

2. The apparatus of claim 1, wherein the sensing unit outputs the sensing signal by sensing the microwave leaked from the resonator at real time.

3. The apparatus of claim 1, wherein the sensing unit is a sensor for measuring high frequency.

4. The apparatus of claim 3, wherein the sensor is an induction coil or detection diode.

5. The apparatus of claim 1, further comprising:
    a current detection unit for generating a current detection signal by detecting a current applied to the magnetron;
    an optical detection unit for generating an optical detection signal by detecting light generated from the electrodeless bulb; and
    a relay unit for passing or intercepting the current applied to the magnetron on the basis of the optical detection signal by receiving the control signal from the control unit for outputting a control signal.

6. The apparatus of claim 5, wherein the control unit outputs the control signal determining that the microwave is leaking if the optical detection signal is not generated in a predetermined time from a point of time when the relay unit is turned on or the current detection signal is generated.

7. The apparatus of claim 5, wherein the current detection unit outputs the current detection signal if the current applied to the magnetron is larger than a reference current value.

8. The apparatus of claim 5, wherein the current detection unit converts the current into a voltage with a current transformer and outputs the voltage as the current detection signal.

9. The apparatus of claim 5, wherein the control unit determines that the microwave is leaking if the optical detection signal is not inputted from the optical detection unit in a predetermined time from a point of time when the microwave is generated and outputs the control signal for turning off the operation of the relay unit.

10. The apparatus of claim 1, further comprising:
    electron wave intercepting glass installed at an upper portion of the resonator, for intercepting microwave leaked from the resonator.

11. The apparatus of claim 10, wherein the electron wave intercepting glass is installed to intercept the microwave leaked by breakdown of the sensing unit.

12. The apparatus of claim 10, wherein the electron wave intercepting glass is coated with conductive substance.

13. The apparatus of claim 12, wherein the conductive substance coats with a thickness smaller than 0.5 mm taking light transmittance rate and electron wave shielding rate into account.

14. The apparatus of claim 12, wherein the conductive substance is $SnO_2$.

15. A method for intercepting leakage of microwave, comprising the steps of:
    generating a current detection signal by detecting current applied to a magnetron;
    generating an optical detection signal by detecting the light from the electrodeless bulb for generating light by microwave outputted from the magnetron; and
    intercepting a power supplied to the magnetron by sensing whether the microwave is leaked on the basis of the current detection signal and optical detection signal.

16. The method of claim 15, wherein the power supplied to the magnetron is intercepted by determining leakage of the microwave if the optical detection signal is not generated in a predetermined time from a point of time when the microwave is generated, in the step of intercepting the power.

17. The method of claim 15, the power supplied to the magnetron is intercepted if the optical detection signal is not-generated, when the value of the current is higher than a reference current value, in the step of intercepting the power.

18. The method of claim 15, the step of intercepting the power includes the steps of:
    determining whether the optical detection signal is generated in a predetermined time with the current detection signal or determining whether the optical detection signal is generated in a predetermined time from a point of time when a relay unit for passing or intercepting the power is turned on; and
    intercepting the power supplied to the magnetron recognizing that the microwave is leaking if the optical detection signal is not generated in a predetermined time.

19. The method of claim 15, further comprising a step of:
    monitoring the optical detection signal after recognizing that the microwave is not leaked, if the optical detection signal is generated in a predetermined time.

20. An apparatus for intercepting leakage of microwave in a lighting apparatus which comprises a magnetron; an electrodeless bulb for generating light by microwave generated from the magnetron; and a resonator for passing light generated from the bulb and intercepting the microwave, the apparatus further comprises:
    a sensing unit installed outside the resonator for outputting a sensing signal by sensing at real time whether the microwave is leaked; and
    a control unit for turning on or off a power supplied to the magnetron in according with the sensing signal.

21. The apparatus of claim 20, wherein the sensing unit outputs the sensing signal by sensing the microwave leaked from the resonator at real time.

22. The apparatus of claim 20, further comprising:
    a current detection unit for generating a current detection signal by detecting a current applied to the magnetron;
    an optical detection unit for generating an optical detection signal by detecting light generated from the electrodeless bulb; and
    a relay unit for passing or intercepting the power applied to the magnetron on the basis of the optical detection signal by receiving the control signal from the control unit for outputting a control signal.

23. The apparatus of claim 22, wherein the control unit outputs the control signal by determining whether the microwave is leaking on the basis of the current detection signal and the optical detection signal.

24. The apparatus of claim 22, wherein the current detection unit outputs the current detection signal if the current applied to the magnetron is larger than a reference current value.

25. The apparatus of claim 22, wherein the control unit outputs the control signal determining that the microwave is leaking if the optical detection signal is not generated in a predetermined time from a point of time when the relay unit is turned on or the current detection signal is generated.

26. The apparatus of claim 20, further comprising:
   electron wave intercepting glass installed at the upper portion of the resonator, for intercepting microwave leaked from the resonator.

27. The apparatus of claim 26, wherein the electron wave intercepting glass is installed to intercept the microwave leaked by breakdown of the sensing unit.

28. The apparatus of claim 27, wherein the electron wave intercepting glass is coated with conductive substance.

29. The apparatus of claim 28, wherein the conductive substance coats with a thickness smaller than 0.5 mm.

30. The apparatus of claim 29, wherein the conductive substance is $SnO_2$.

31. An apparatus for intercepting leakage of microwave in a lighting apparatus which comprises a magnetron; an electrodeless bulb for generating light by microwave generated from the magnetron; a resonator for passing light generated from the bulb and intercepting the microwave; and a reflector for reflecting light which passed the resonator, the apparatus further comprises:
   a current detection unit for generating a current detection signal by detecting a current applied to the magnetron;
   an optical detection unit for generating a optical detection signal by detecting light generated from the electrodeless bulb;
   a control unit for outputting a control signal by determining whether the microwave is leaked on the basis of the optical detection signal and the current detection signal; and
   a relay unit for passing or intercepting the power applied to the magnetron in according with the control signal.

32. The apparatus of claim 31, wherein the current detection unit outputs the current detection signal if the current applied to the magnetron is larger than a reference current value.

33. The apparatus of claim 31, wherein the control unit outputs the control signal determining that the microwave is leaking if the optical detection signal is not inputted in a predetermined time from a point of time when the relay unit is turned on or the current detection signal is generated.

34. The apparatus of claim 31, further comprising:
   electron wave intercepting glass installed at the upper portion of the resonator and formed by coating $SnO_2$ with a thickness smaller than 0.5 mm on a surface of the glass to intercept microwave leaked from the resonator.

* * * * *